(12) United States Patent
Davis et al.

(10) Patent No.: US 9,014,178 B1
(45) Date of Patent: Apr. 21, 2015

(54) TELECOMMUNICATION SYSTEM

(71) Applicant: Gage Networks LLP, Oakham, Rutland (GB)

(72) Inventors: Andrew Brandon Davis, Oakham (GB); Timothy Helstrip, Northants (GB)

(73) Assignee: Gage Networks LLP, Oakham, Rutland (GB)

( * ) Notice: Subject to any disclaimer, the term of this patent is extended or adjusted under 35 U.S.C. 154(b) by 0 days.

(21) Appl. No.: 14/505,742

(22) Filed: Oct. 3, 2014

(30) Foreign Application Priority Data

Oct. 3, 2013 (GB) .................................... 1317538.5

(51) Int. Cl.
| | |
|---|---|
| *H04L 12/66* | (2006.01) |
| *H04M 7/00* | (2006.01) |
| *H04W 4/16* | (2009.01) |
| *H04L 29/06* | (2006.01) |
| *H04L 29/08* | (2006.01) |

(52) U.S. Cl.
CPC .............. *H04M 7/0075* (2013.01); *H04W 4/16* (2013.01); *H04L 63/0407* (2013.01); *H04L 67/22* (2013.01)

(58) Field of Classification Search
CPC ............ H04M 15/886; H04M 1/2745; H04M 1/72522; H04M 1/72561; H04M 1/72597; H04M 3/42017; H04M 3/4878; H04W 4/24; H04W 8/22; H04L 63/0407; H04L 67/22
See application file for complete search history.

(56) References Cited

U.S. PATENT DOCUMENTS

| | | | |
|---|---|---|---|
| 7,139,370 B1 | 11/2006 | Tse | |
| 7,593,355 B1 | 9/2009 | Surazski et al. | |
| 8,615,786 B1* | 12/2013 | Bryce et al. ....................... | 726/2 |
| 2008/0320101 A1 | 12/2008 | Bennett et al. | |
| 2009/0193513 A1* | 7/2009 | Agarwal et al. ................. | 726/15 |
| 2011/0307341 A1 | 12/2011 | Zohar et al. | |
| 2013/0151590 A1 | 6/2013 | Feng | |

FOREIGN PATENT DOCUMENTS

WO  2014025313 A1  2/2014

OTHER PUBLICATIONS

English Abstract and Machine Translation for KR1020080007883 (dated Jan. 23, 2008), 8 pgs.

(Continued)

*Primary Examiner* — David Oveissi
(74) *Attorney, Agent, or Firm* — Fredrikson & Byron, P.A.

(57) ABSTRACT

A telecommunication system comprising a computer system comprising a store of representations of telecommunication actions and a store of representations of telecommunication rules. A URL is associated with each of the telecommunication actions. The computer system is configured to, at least in part, command the telecommunication actions. Each telecommunication action is carried out, at least in part, in a manner dependent on at least one of the telecommunication rules. In response to an electronic device accessing a URL associated with one of the telecommunication actions, the telecommunication action is carried out, at least in part, in a manner dependent on at least one of the telecommunication rules. The telecommunication system is configured to change the unique URL to a new unique URL in response to a telecommunication action and associate a different telecommunication action with the new unique URL and/or change a telecommunication action associated with the unique URL.

18 Claims, 4 Drawing Sheets

(56) References Cited

OTHER PUBLICATIONS

Search Report for GB1317538.5 dated Jun. 10, 2014, from which the instant application is based, 3 pgs.

International Search Report and Written Opinion of the International Searching Authority for Intl. Patent App. No. PCT/GB2014/53002 dated Feb. 9, 2015, 9 pages.

* cited by examiner

TELECOMMUNICATION SYSTEM

FIELD OF THE INVENTION

The present invention relates to a telecommunication system.

BACKGROUND OF THE INVENTION

Individuals today use many different electronic devices to make telephone calls. For example, a single person may regularly use a mobile telephone or smart phone, a landline telephone in their home and a landline telephone at their place of work. Each of these devices has its own features such as its own telephone number, its own voicemail and its own missed call notification arrangements. Internet based telecommunication systems such as Voice over Internet Protocol (VoIP) allow communications through computers, such as laptops and smart phones, using services such as Skype (registered trade mark).

Both software and hardware have been used to improve the functionality of telecommunication systems.

An example of software features that give greater functionality to an individual electronic device or phone is provided as part of the Apple iOS 7 operating system for use, for example, on an Apple iPhone (registered trade mark) smart phone.

One example feature that is provided by the Apple iOS 7 operating system is a reminders function. The reminders are alarms that remind the user of the phone on which the operating system is installed on to do something. The reminders may be location based. That is to say, an alarm is triggered when the phone is in a particular location. This is achieved by the operating system interrogating the integrated global positioning system (GPS) of the smart phone on which it is installed. The reminders may also be triggered at a particular time. A reminder may be, for example, to ring home when leaving the office, which will be displayed on the display of the smart phone.

Another example feature provided by the Apple iOS 7 operating system is a particular missed call return arrangement. With this arrangement, if a call is received by the phone, but not answered, software as part of the operating system on the phone provides options for returning the call including returning the call to the same number using the telephone network on which the phone is subscribed or returning the call using the Apple FaceTime (registered trade mark) videotelephony application. Also using the contacts feature provided, they have this choice, as well as the ability to send a message (either using the instant messaging service iMessage or an SMS text).

One example of a hardware-based system that integrates mobile phones with desk phones in an enterprise network, so-called fixed-mobile convergence, is produced by Tango Networks, of Frisco, Tex., United States. The Tango Networks Abrazo product enables enterprise users to use their mobile phone and work landline phone interchangeably, for example, such that they only have one voicemail box, one caller identification (ID) when they call out, and they can always be contacted on the same number whether they are using their mobile phone or work landline phone. This is achieved by giving a user's mobile phone and desk phone the same identity. In other words, the user's mobile phone and desk phone are clones. Thus, by way of example, if the mobile phone number is called and it rings the user's desk phone also rings.

This system has a bespoke server in the mobile telephone network that a mobile phone using the service uses and a bespoke server at a PBX (private branch exchange) on the enterprise phone system with a communication connection between the two servers. The system effectively intercepts phone calls at the trigger level, which enables the type of functionality described above to be carried out.

While this system is effective, once installed, it is very inflexible. It only works for enterprises with PBXs, which is generally only very large enterprises. Furthermore, it requires integration into the "core" layer of the mobile network. This requires the cooperation of mobile network operators. In addition, to make changes to the system, significant hardware additions need to be made.

Several arrangements with very limited and inflexible functionality can be found in the patent literature prior art as explained below.

U.S. Pat. No. 7,139,370 assigned to Nortel Networks Limited describes a communication system that uses hyperlinks, each associated with a URL (uniform resource locator), to establish call sessions. The hyperlinks point to telephone numbers to be used for establishing call sessions.

U.S. Pat. No. 7,593,355 assigned to Cisco Technology, Inc. describes a method and apparatus in which URLs are mapped to phone numbers. A caller enters a phone number into their phone and then the number is routed to a mapping service that maps the phone number to a URL. The URL is routed to the caller's phone and the caller can access the URL through an HTTP server in order to carry out a VoIP call.

Korean patent application with publication No. KR20087883 in the name of LG Electronics Inc. describes an apparatus and method for storing a callback URL in a mobile terminal so that a user can access a desired call-back URL site.

BRIEF SUMMARY OF THE INVENTION

Examples of the invention described herein provide a telecommunication system or architecture that provides flexible integration of services to a range of electronic devices, such as mobile phones or smart phones and desktop phones. It allows functionality to be added to the telephone system easily, for example, based on simple parameter configuration changes without any hardware changes to the system. Advantageously, functions of the telecommunication system may be controlled with a single press of a button or touch of a touch screen or mouse-click of an electronic device.

The invention in its various aspects is defined in the independent claims below to which reference should now be made. Advantageous features are set forth in the dependent claims.

Arrangements are described in more detail below and take the form of a telecommunication system comprising a computer system comprising a store of representations of telecommunication actions. A unique uniform resource locator, URL, is associated with each of the telecommunication actions. The computer system is configured to, at least in part, command the telecommunication actions. The computer system also comprises a store of representations of telecommunication rules, wherein each telecommunication action is carried out, at least in part, under the command of the computer system in a manner dependent on at least one of the telecommunication rules. The telecommunication system is configured such that, in response to an electronic device accessing a URL (an original or first URL) associated with one of the telecommunication actions, the telecommunication action is carried out, at least in part, under the command of the computer system in a manner dependent on at least one of the telecommunication rules; and wherein the telecommunication system is configured to change the unique URL to a new unique URL in response to a telecommunication action and associate a different telecommunication action with the new unique URL and/or change a telecommunication action associated with the unique original or first URL.

Thus, a scenario or sequence of telecommunication actions may be carried out on which later telecommunication actions are dependent on the results or outcome of the rules followed by an earlier telecommunication action. This may be in response to a changing or an unchanging URL. Thus, three URL scenarios are possible. A new response or result of the rules followed by a telecommunication action may: amend or change an original URL; create a new URL; or not change the URL and complete the scenario regardless. Each of these URLs is associated with a telecommunication action carried out, at least in part, under the command of the computer system in a manner dependent on at least one stored telecommunication rule.

The telecommunication actions that may be carried out by the telecommunication system are highly and easily configurable with software parameter configuration changes only. That is, by changing the stored telecommunication rules. Some example telecommunication actions are set-out below.

The telecommunication system described enables, for example, a missed call received on a mobile phone to be returned using a desktop phone or, indeed, any phone associated with the user. This may be controlled by any device with a web browser, such as, a smartphone or computer such as a tablet computer, desktop computer or laptop computer. In the example described, this is achieved by a simple touch or press of a touch screen of the device. A missed call notification may have a plurality of icons indicating from which device to return the call or from an address book. The telecommunication system described enables, for example, selection of the device to place a call from, not necessarily to be the device from which an instruction is sent. For example, a device in the form of a mobile phone may be used to commence a call from a desk phone or soft phone (a phone running in software on a computer). Again, in the example described, this is achieved by a simple touch or press of a touch screen of the device.

Other functionality may be provided by example implementations of the telecommunication system or architecture of the present invention. For example, the telecommunication system may enable a call to be moved during a call from one electronic device to another electronic device. This may be controlled by another device or third device, which may be any electronic device with a web browser such as a smartphone or computer such as a tablet computer, desktop computer or laptop computer. Preferably, the electronic device has a touch screen. And, again, this functionality may be achieved by a simple single touch or press of a touch screen of the device. The telecommunication system may enable, for example, simple and immediate addition into a multi-party conference call, for example, with a single touch or press of a touch screen of a device. An invitation for a conference call may be sent to multiple parties or devices. Each of the parties may opt to join the conference call by a simple single touch or press of a touch screen of the device. A request to join a conference call may be sent to the multiple parties or devices at the time of the conference call to a device or devices of each of the invited parties (who accepted the invitation). In this way, no personal identification number (PIN) or code is required simplifying use.

Examples of the telecommunication system may provide integration of mobile and landline services with great flexibility where functionality may be added or changed with a simple parameter configuration.

An application or app may be provided that provides a view of all management capabilities to obtain or display configuration and information with a single touch or press.

Examples of the telecommunication system described provide the ability to place a secure communications call (for example, single party, multi-party, voice, or video) with a single touch of a user interface, such as a touch screen, at the same time ensuring all of the necessary user and device authentication is carried out in the background. As the telecommunication action carried out is between a defined set of devices as defined in the particular URL, the system is very secure.

The arrangements described may apply to, for example, voice calls, video calls, and online chat including instant messaging.

The telecommunication system may be Internet or Cloud based. In examples of the present invention, all of the single touch capabilities are accessed using a web browser. A window or display of an electronic device displays icons to touch or select to control an electronic device such as a smart phone using the system. These icons may have the appearance of those displayed on a device using, for example, the Google Android, Microsoft Windows or Apple iOS (registered trade marks) operating systems. As a result of using a web browser to operate the telecommunication system, the telecommunication system is operating system independent. Thus, using an icon to access the system, the full functionality (such as making a call) accesses all of the capability in the Internet or Cloud and not just the resources of the device, such as the mobile phone or smart phone, accessing the system.

In the examples described, this better integration is achieved by a telecommunication system that uses a real time dynamic call flow management key or dynamic communications key in the form of an event originated unique key. The key forms part of a uniform resource locator (URL). The elements of the key are managed through a rules based engine or computer system and required call scenario. The key may be "upgraded" or changed in real time throughout a single call flow in order to provide the call flow results required. This is typically achieved by appending further characters to the existing key.

Broadly, in an example embodiment of the present invention, there is provided a telecommunication system comprising: a computer system comprising a store of representations of telecommunication actions, wherein a unique uniform resource locator, URL, is associated with each of the telecommunication actions, the computer system being configured to, at least in part, command the telecommunication actions; the telecommunication system being configured such that, in response to an electronic device accessing a URL associated with one of the telecommunication actions, the telecommunication action is carried out, at least in part, under the command of the computer system.

Broadly, in another example embodiment of the present invention, there is provided a telecommunication system comprising: a computer system comprising a store of representations of telecommunication actions, wherein a unique uniform resource locator, URL, is associated with each of the telecommunication actions, the computer system being configured to, at least in part, command the telecommunication actions; the telecommunication system being configured such that after one of the telecommunication actions has been commanded, at least in part, by the computer system, a new unique URL is generated associated with a telecommunication action, wherein a representation of the telecommunication action is stored in the store. In these example embodiments, the computer system comprises a store of representations of rules, wherein each telecommunication action is carried out, at least in part, under the command of the computer system in a manner dependent on at least one of the telecommunication rules. In these example embodiments, the telecommunication system is configured to change the unique URL to a new unique URL in response to a telecommunication action and associate a different telecommunication action with the new unique URL. In these example embodiments, the telecommunication system is configured to change a telecommunication action associated with a unique URL. The change may be in response to a telecommunication action.

In an aspect of the present invention, there is provided a telecommunication system comprising: a computer system comprising: a store of representations of telecommunication actions, wherein a unique uniform resource locator, URL, is associated with each of the telecommunication actions, the computer system being configured to, at least in part, command the telecommunication actions; and a store of representations of telecommunication rules, wherein each telecommunication action is carried out, at least in part, under the command of the computer system in a manner dependent on at least one of the telecommunication rules; the telecommunication system being configured such that, in response to an electronic device accessing a URL associated with one of the telecommunication actions, the telecommunication action is carried out, at least in part, under the command of the computer system in a manner dependent on at least one of the telecommunication rules; and wherein the telecommunication system is configured to change the unique URL to a new unique URL in response to a telecommunication action and associate a different telecommunication action with the new unique URL and/or change a telecommunication action associated with the unique URL.

The unique URL may comprise a unique URL key. The change to the unique URL may comprise one or more additional characters being added to a URL key of the unique URL to generate a new unique URL key. The unique URL may be accessed by a web browser by selecting a predetermined portion on a display of the electronic device. The unique URL may be accessed by a web browser of the electronic device by the electronic device being located at a predetermined location. The computer system may be configured to generate at least one unique URL associated with a telecommunication action in response to a trigger. The computer system may be configured to generate a plurality of unique URLs each associated with a telecommunication action in response to a trigger. The computer system may be configured to generate the or each unique URL randomly or pseudo-randomly. In response to the trigger, a representation of the or each unique URL may be sent to a predetermined recipient. The representation of the or each unique URL may be sent to the predetermined recipient by one or more of: e-mail, missed call notification, instant message, SMS message or text, electronic calendar event. The trigger may comprise at least one of: a telephone call, a scheduled telephone call, a missed telephone call, location of the electronic device, electronic device status, administration input, telephone call duration, telephone call has already happened, user input, social media input. The rules may comprise at least one of: user settings, corporate settings, administration settings, authentication requirements, validation requirements, device requirements. The telecommunication action may be carried out on the electronic device or at least one other predetermined electronic device. The URL may be associated with content for use on the electronic device or at least one other predetermined electronic device. The content may be for display on the electronic device or the at least one other predetermined electronic device. The telecommunication system may be configured such that, in response to an electronic device accessing a URL associated with one of the telecommunication actions, a representation of the content is transmitted to the electronic device or the at least one other predetermined electronic device. The content may be a representation of the telecommunication action's status. The telecommunication actions may comprise at least one of: a single call, a returned call, a scheduled call, a scheduled call with at least one deputy, a conference call, a conference call with at least one deputy, a planned alternative telephone call scenario. The electronic device may comprise a computer or a telephone. At least one of the at least one other predetermined electronic device may comprise a computer or a telephone.

Broadly, in an example embodiment of the present invention, there is provided a telecommunication method, the method comprising: an electronic device accessing a unique uniform resource locator, URL, wherein the URL is associated with a telecommunication action and a representation of the telecommunication action is stored in a store of a computer system; and in response to the electronic device accessing the unique URL, the telecommunication action associated with the unique URL being carried out, at least in part, under the command of the computer system.

Broadly, in a further example embodiment of the present invention, there is provided a telecommunication method, the method comprising: accessing a unique uniform resource locator, URL, wherein the URL is associated with a telecommunication action and a representation of the telecommunication action is stored in a store of a computer system; and, in response: the computer system commanding, at least in part, the telecommunication action associated with the unique URL; and generating a new unique URL associated with a telecommunication action, wherein a representation of the telecommunication action is stored in the store.

In these example embodiments, the computer system further comprises a store of representations of rules, and wherein in response to the electronic device accessing the unique URL, the telecommunication action associated with the unique URL may be carried out, at least in part, under the command of the computer system in a manner dependent on at least one of the telecommunication rules. In these example embodiments, the telecommunication method may further comprise the telecommunication system changing the unique URL to a new unique URL in response to a telecommunication action and associating a different telecommunication action with the new unique URL. In these example embodiments, the telecommunication method may further comprise the computer system changing a telecommunication action associated with a unique URL. The change may be in response to a telecommunication action.

In an aspect of the present invention there is provided, a telecommunication method, the method comprising: an electronic device accessing a unique uniform resource locator, URL, wherein the URL is associated with a telecommunication action and a representation of the telecommunication action is stored in a store of a computer system; and in response to the electronic device accessing the unique URL, the telecommunication action associated with the unique URL is carried out, at least in part, under the command of the computer system in a manner dependent on at least one telecommunication rule stored in a store of the computer system; and wherein the telecommunication method further comprises changing the unique URL to a new unique URL in response to a telecommunication action and associating a different telecommunication action with the new unique URL and/or changing a telecommunication action associated with the unique URL.

The unique URL may comprise a unique URL key. Changing the unique URL may comprise adding one or more additional characters to a URL key of the unique URL to generate a new unique URL key. The telecommunication method may further comprise a web browser accessing the unique URL by selecting a predetermined portion on a display of the electronic device. The telecommunication method may further comprise a web browser accessing the unique URL by the electronic device being located at a predetermined location. The telecommunication method may further comprise the computer system generating at least one unique URL associated with a telecommunication action in response to a trigger. The telecommunication method may further comprise the computer system generating a plurality of unique URLs each associated with a telecommunication action in response to a trigger. The telecommunication method may further comprise the computer system generating the or each unique URL randomly or pseudo-randomly. The telecommunication method may further comprise sending a representation of the or each unique URL to a predetermined recipient in response to the trigger. The telecommunication method may further comprise sending a representation of the or each unique URL to a predetermined recipient in response to the trigger by one or more of: e-mail, missed call notification, instant message, SMS message or text, electronic calendar event. The trigger may comprise at least one of: a telephone call, a scheduled telephone call, a missed telephone call, location of the electronic device, electronic device status, administration input, telephone call duration, telephone call has already happened, user input, social media input. The rules may comprise at least one of: user settings, corporate settings, administration settings, authentication requirements, validation requirements, device requirements. The telecommunication action may be carried out on the electronic device or at least one other predetermined electronic device.

The URL may be associated with content for use on the electronic device or at least one other predetermined electronic device. The content may be for display on the electronic device or the at least one other predetermined electronic device. The telecommunication method may further comprise an electronic device accessing a URL associated with one of the telecommunication actions and, in response, transmitting a representation of the content to the electronic device or the at least one other predetermined electronic device. The content may be a representation of the telecommunication action's status. The telecommunication actions may comprise at least one of: a single call, a returned call, a scheduled call, a scheduled call with at least one deputy, a conference call, a conference call with at least one deputy, a planned alternative telephone call scenario. The electronic device may comprise a computer or a telephone. At least one of the at least one other predetermined electronic device may comprise a computer or a telephone.

In an embodiment of the present invention, there is provided a computer system for commanding a telecommunication action, the computer system comprising: a store of representations of telecommunication actions, wherein a unique uniform resource locator, URL, is associated with each of the telecommunication actions, the computer system being configured to, at least in part, command the telecommunication actions; the computer system being configured such that, in response to an electronic device accessing a URL associated with one of the telecommunication actions, the telecommunication action is carried out, at least in part, under the command of the computer system.

In a yet further embodiment of the present invention, there is provided a computer system for commanding a telecommunication action, the computer system comprising: a store of representations of telecommunication actions, wherein a unique uniform resource locator, URL, is associated with each of the telecommunication actions, the computer system being configured to, at least in part, command the telecommunication actions; the computer system being configured such that after one of the telecommunication actions has been commanded, at least in part, by the computer system, a new unique URL is generated associated with a telecommunication action, wherein a representation of the telecommunication action is stored in the store.

In a further embodiment of the present invention, there is provided a computerized method of commanding a telecommunication action, the computerized method comprising: an electronic device accessing a unique uniform resource locator, URL, wherein the URL is associated with a telecommunication action and a representation of the telecommunication action is stored in a store of a computer system; and in response to the electronic device accessing the unique URL, the telecommunication action associated with the unique URL being carried out, at least in part, under the command of the computer system.

In another embodiment of the present invention, there is provided a computerized method for commanding a telecommunication action, the computerized method comprising: accessing a unique uniform resource locator, URL, wherein the URL is associated with a telecommunication action and a representation of the telecommunication action is stored in a store of a computer system; and, in response: at least in part, commanding the telecommunication action associated with the unique URL; and generating a new unique URL associated with a telecommunication action, wherein a representation of the telecommunication action is stored in the store.

A computer program may be configured to instruct a computer system to perform the method set-out above.

A computer-readable medium containing a set of instructions may cause a computer system to perform the method set-out above. The computer-readable medium may be, for example, a CD-ROM, DVD-ROM or solid state memory device or memory stick.

BRIEF DESCRIPTION OF THE DRAWINGS

The invention will be described in more detail, by way of example, with reference to the accompanying drawings, in which.

DETAILED DESCRIPTION OF THE INVENTION

Figure 1:
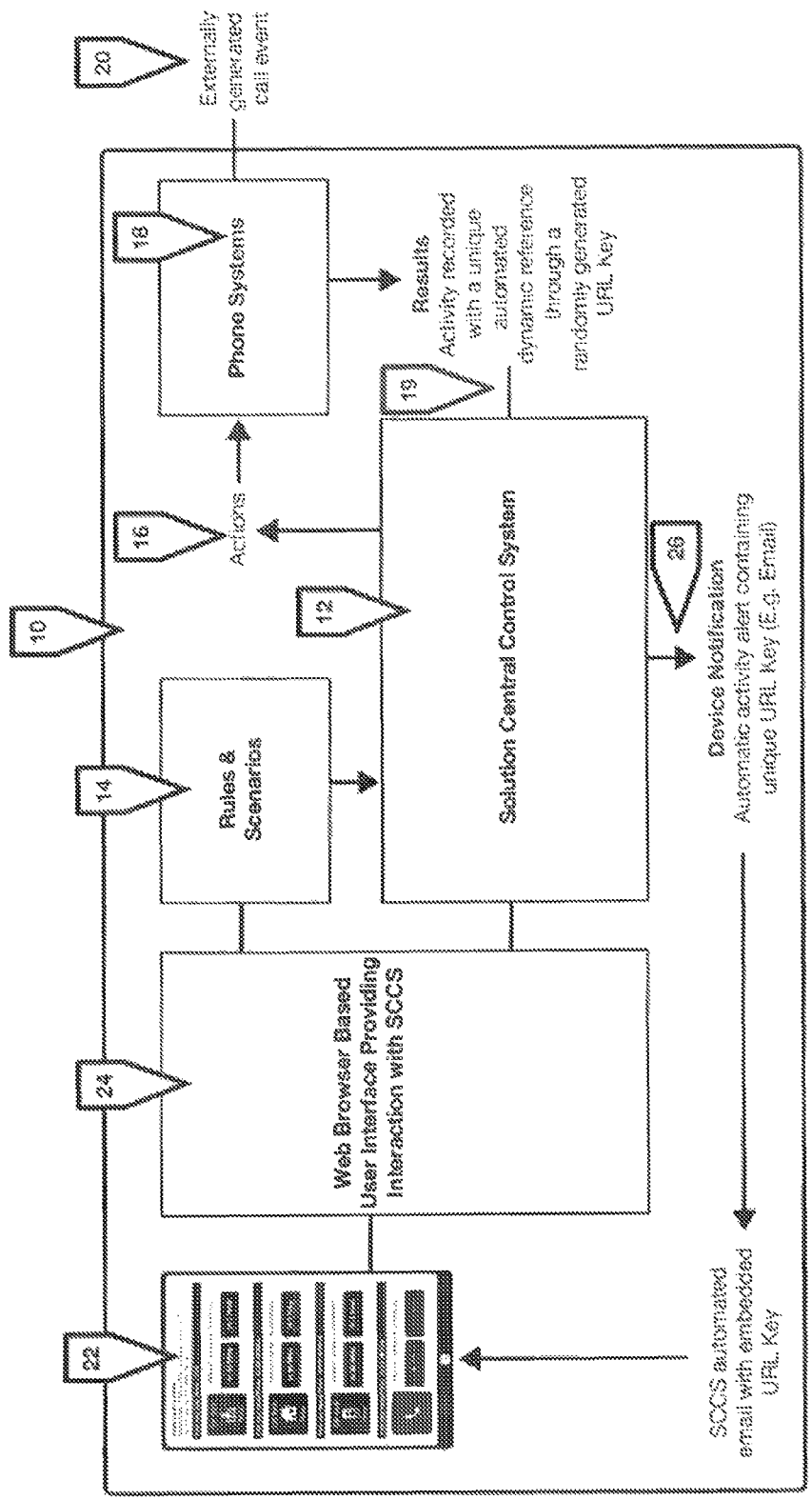
FIG. 1 is a schematic of a telecommunication system embodying an aspect of the present invention.

An example telecommunication system 10 will first be broadly described with reference to FIG. 1. The telecommunication system or dynamic call flow management system (DCMS) comprises a computer system or solution central control system 12. This may be a single computer or computers on a network. The or each computer includes storage such as memory and/or a hard disk drive and a processor or processors that interact under control of a computer program stored in the storage. In this example, the computer system is implemented on the Internet in the so-called Cloud. The computer system is in communication connection via path 16 with an existing phone system 18 to control or command the phone system. The phone system may be, for example, a hosted PBX, the public switched telephone network, the GSM (Global System for Mobile Communications) network or LTE (Long Term Evolution) network. The computer system is in communication connection via path 19 with the existing phone system such that the computer system may be provided with information from the phone system. An electronic device 22, such as a mobile phone, smart phone or computer, including web browser software 24 (such as Microsoft Internet Explorer, Apple Safari or Mozilla Firefox—all registered trade marks) allows interaction between the electronic device and the computer system 12.

The computer system 12 includes a store of representations of telecommunication actions or scenarios and a store of representations of rules 14. These are stored in a database, which in this example, is stored on a hard disk drive or disk drives of the computer system. Each telecommunication action is dependent on or controlled by at least one of the rules. Telecommunication actions or scenarios include, for example, a single call, a returned call, a scheduled call, a scheduled call with at least one deputy, a conference call, a conference call with at least one deputy, and a planned alternative telephone call scenario. The rules include user settings, corporate settings, administration settings, authentication requirements, validation requirements and device requirements. An administration setting may be, for example, that no action is to be taken regarding a particular telephone number (perhaps because the telephone to which the telephone number relates has been stolen or because the user is no longer employed by a particular company).

Figure 2:
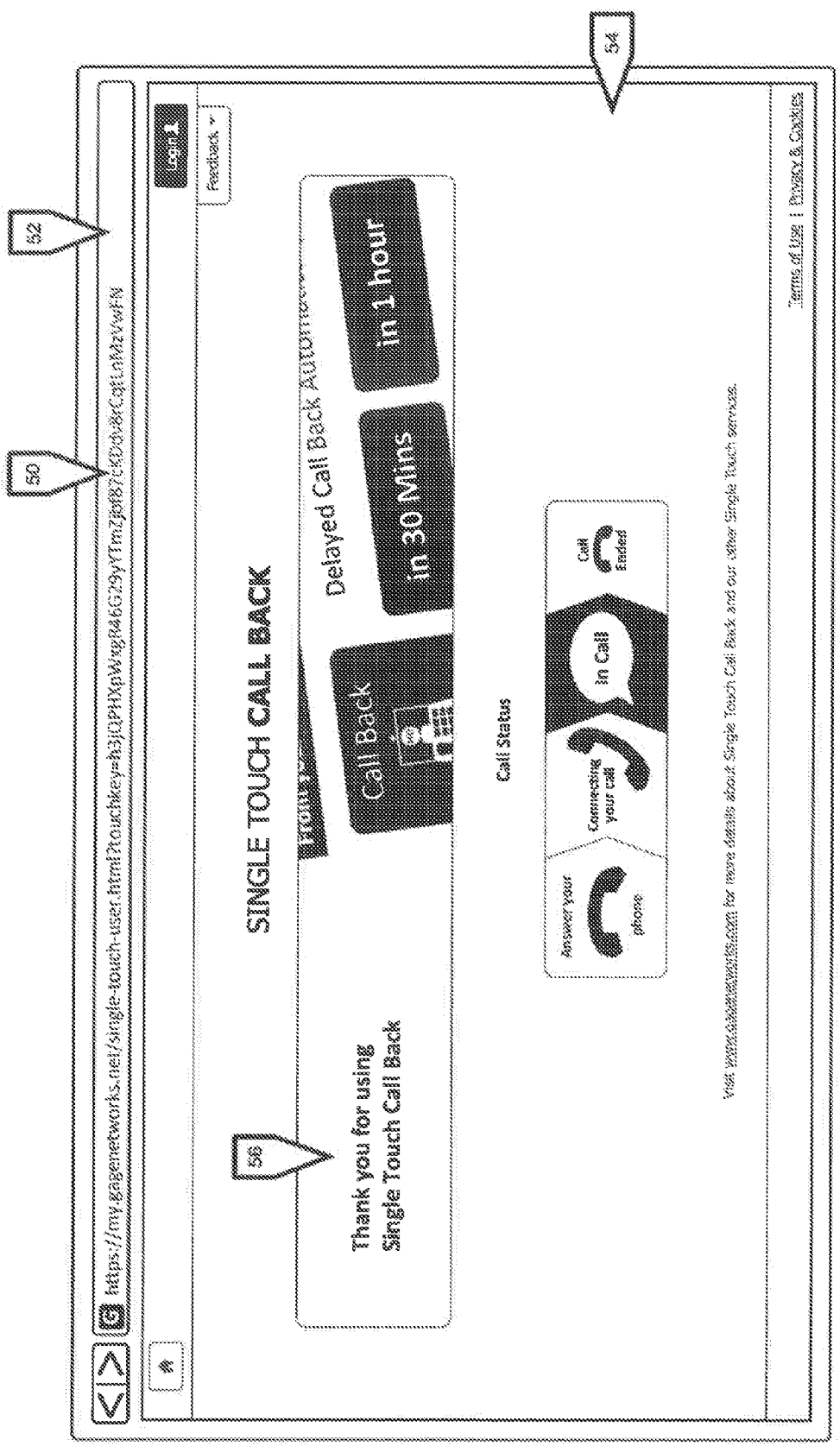
FIG. 2 is a view of an example screen display of an electronic device of the telecommunication system of FIG. 1.

Significantly, a unique uniform resource locator (URL), in particular, a unique URL key, is associated with each telecommunication action. The URL keys that are generated map to entries in a database of the computer system 12. These entries generate telecommunication system actions that control aspects of the telecommunication activity. A URL key is the part of the URL after the top level domain name. For example, http://www.gagenetworks.com/abc123 has a URL key of abc123. A longer URL key 50 is illustrated in FIG. 2. FIG. 2 illustrates a browser display of a web page 54 that is part of the computer system and is described in more detail below. It illustrates a status screen display for a specific call scenario or action. The browser includes an address bar 52 that includes the URL of: my.gagenetworks.net/single-touch-user.html?touchkey=h3jQPHXpWxgR4k6G29yYTm . . . . The URL key (the portion after the top level domain name) in this example is: single-touch-user.html?touchkey=h3jQPHXpWxgR4k6G29yYTm . . . .

In this example, the URL key used is dynamic. It forms a dynamic communications key. The URL key may change over time as a telecommunication activity or action is carried out. For example, a different URL key may be generated depending on call flow or status of the telecommunication activity, such as whether a telephone call is being made, in a telephone call or ending a telephone call. Each of the so generated URLs would map to a different entry in the database of the computer system 12. A new URL may be generated based on a rules based decision tree. A representation of such a decision tree is stored in the store 14 of the computer system 10. The telecommunication system changes a unique URL to a new unique or different URL in response to a telecommunication action and associates a different telecommunication action with the new unique URL. For example, as a telecommunication session progresses different URLs are generated each associated with a different action as part of the session. For example, if a returned call is not successful, an alternative number may be provided. A new URL may be generated to represent or reflect the telecommunication action of making a call to the alternative number.

The telecommunication action or status associated with a URL key may be dynamic. The telecommunication action associated with a URL may change over time. For example, once a URL has been accessed to initiate a telephone call to a particular number, subsequently accessing the URL may result in no call being initiated or a call to a different telephone number being made. That is to say, the URL may be amended in line with the call flow process and/or the rules set in the corporate governance or the user definition rules base. The same URL may also enable a plurality of different actions without the URL being amended. The telecommunication system may change a telecommunication action associated with a unique URL. For example, one underlying condition of the URL may be that it will expire in a certain time and no longer be valid, or expire after it has been used a predetermined number of times such as once or twice. In this way, for example, if a call back notification is sent in an email, that same email cannot be used multiple times to make the call back. Another use is when a call list (a list of calls to be made) is provided. In this example, each call is associated with a URL, the dynamic actions are then that when one of the calls in the list is successfully made the list is updated, or if a call is made but needs to be remade (for example, because there is no answer or an answer machine response) then the list is updated automatically and a new call is automatically scheduled in the caller's calendar. The key point here is that the URL itself remains the same, but the actions associated with it alter depending on rules and results.

The URL may be associated with content for use on the electronic device typically for display. Thus, when an electronic device accesses a particular URL associated with one of the telecommunication actions, in response, a representation of the content is transmitted to the electronic device.

Significantly, these features either individually or together enable different content to be displayed to the electronic device 22 accessing a URL over time during telecommunication activity. This content is tied to or linked to a telecommunication action or call. The content displayed on the electronic device is dynamic. The content may change in real time with call flow; the call flow being on a different network to the content.

Figure 3:
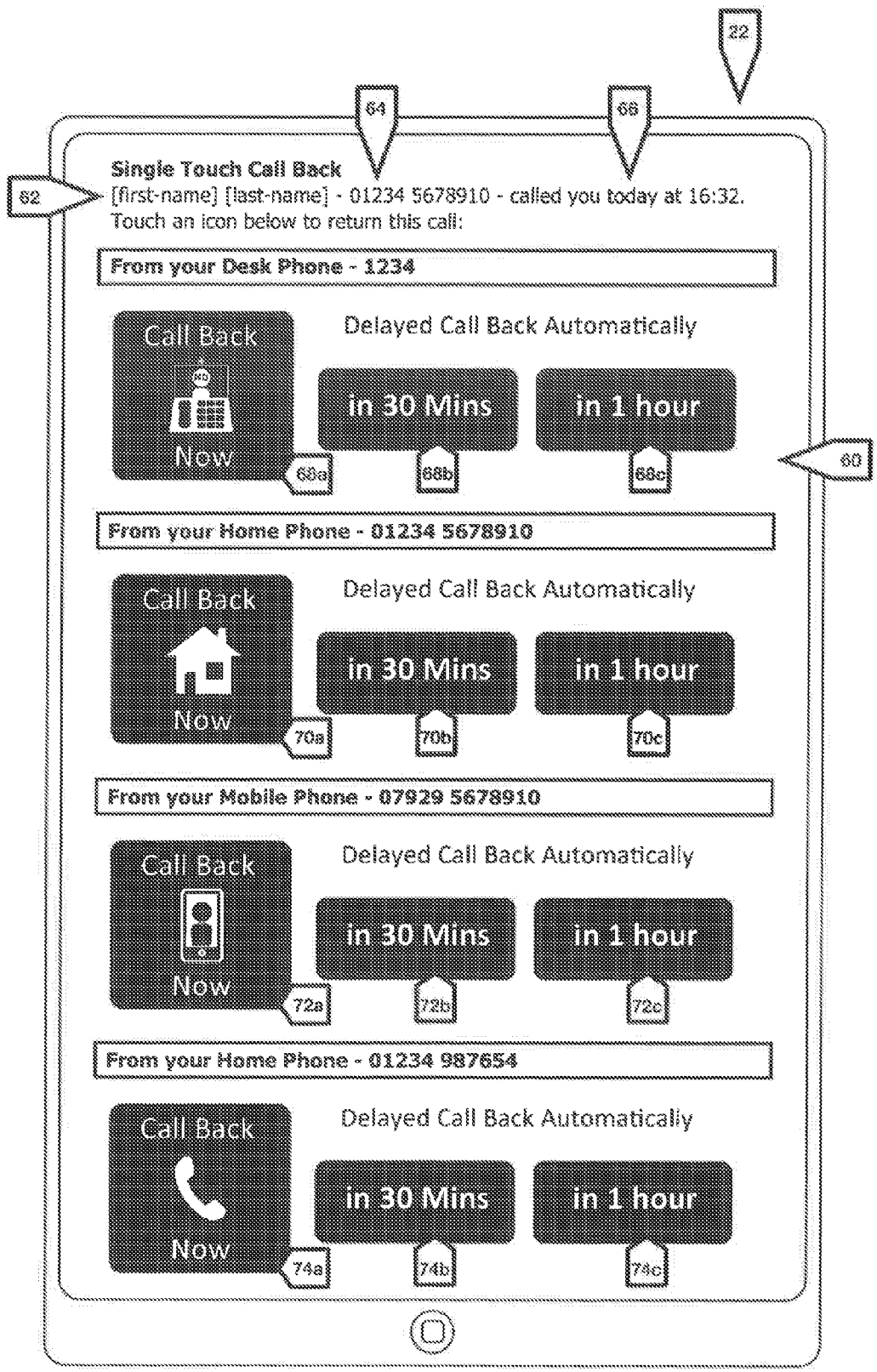
FIG. 3 is a schematic of an electronic device of the telecommunication system of FIG. 1.

Referring again to FIG. 1, the computer system 12 also includes a device notification output 26. This allows the computer system to send an indication of the URL associated with a telecommunication action to a predetermined user or recipient. Typically, the URL is sent in an e-mail and, in particular, embedded in the e-mail, typically given the appearance of a button as illustrated in FIG. 3 (described in more detail below). However, the URL may be provided by other means. For example, it may be sent as a missed call notification, in an instant message, in an SMS message or text, or as an electronic calendar event. Selecting the URL triggers a web browser of the electronic device 22 on which the e-mail is read to access the URL associated with the telecommunication action. A web browser based user interface is provided for the electronic device 22 to interact with the computer system 12. It is significant that a web browser is used to access the computer system rather than a bespoke computer program, software or app. As a web browser is used, any electronic device with a standard web browser can access the computer system. This adds to the flexibility of the system as no special software is required to be installed on the electronic device. In this example, the appearance of aspects of the system mimic that of an app thus it forms a so-called "over the top" browser based "app". Also significantly, only a single touch or selection of the button is made to access the unique URL key. This provides a very user-friendly arrangement.

A URL may be accessed in other ways than selecting it using a representation of a button on a touch screen of the electronic device 22. For example, location based services may be provided. A URL may be accessed by an electronic device if the electronic device is in a particular or predetermined location. A location detecting arrangement of the electronic device, such as a GPS, may provide an indication of location of the electronic device to software on the electronic device that causes or triggers a particular URL to be accessed. By way of example, this may be arranged such that when a user carrying an electronic device enters their office, it accesses a particular URL, that causes their desk phone to call a particular number.

The phone system 18 (as mentioned above, typically a PBX) may operate independently of the computer system 12 and call events are generated external to it via input 20. For example, one party may call another party on the phone system without use of the computer system 12. In this example, the phone system includes an output 19 that gives an indication of the result of call events on it. These call events may have been triggered without use of the computer system (via externally generated call event input 20) or using the computer system. A result may be, for example, that a phone call from one party to another party (the telecommunication action) has not been answered within a predetermined time or that all invited parties joined a pre-arranged conference call. The resulting output from output 19 would reflect this. This results output is input into the computer system 12.

The telecommunication system 10 is configured such that, in response to an electronic device, such as a computer or telephone 22, accessing a URL associated with a telecommunication action, an appropriate action request or command 16 representing the stored telecommunication action or scenario controlled by the rules is sent by the computer system 12 to the existing phone system or telecommunication network 18. Thus, the telecommunication action is carried out, at least in part, under the command of the computer system.

Figure 4:
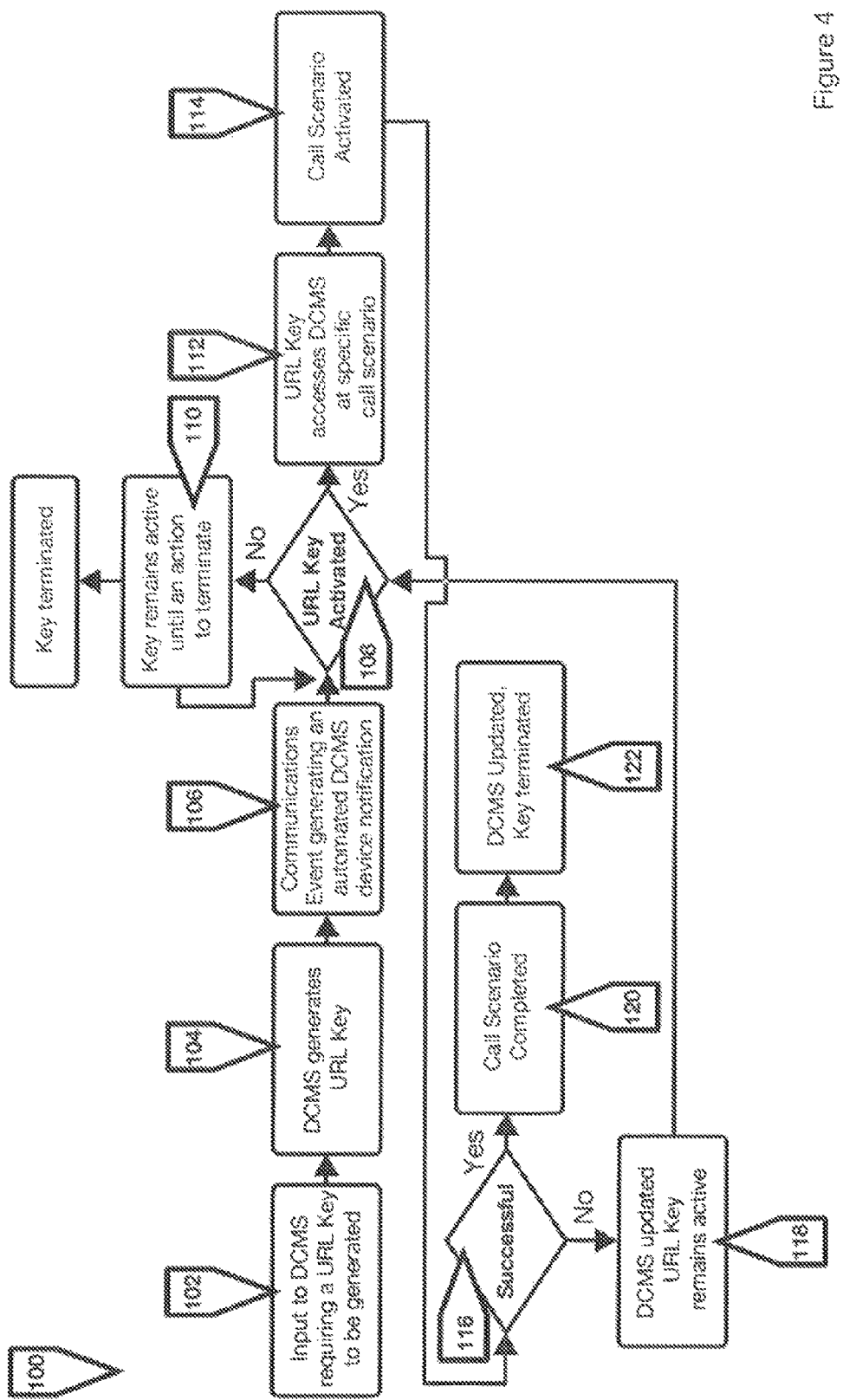
FIG. 4 is a flow diagram illustrating the operation of the telecommunication system of FIG. 1.

The process or method carried out by the telecommunication system is illustrated in more detail in the flow diagram 100 FIG. 4 with reference to FIG. 1.

As shown by step 102 of FIG. 4, a trigger telecommunication event or externally generated call event 20 (see FIG. 1) is sent to the phone system 18, which is sent to the input 19 of the computer system 12. The externally generated call event is provided by an electronic device, such as a mobile phone or smartphone. The trigger or externally generated call event may be, for example, a telephone call, a scheduled telephone call, a missed telephone call, location of the electronic device, electronic device status, administration input, telephone call duration, telephone call has already happened, user input, or social media input.

As shown at step 104 of FIG. 4, the computer system 12 generates a unique URL and, in particular, a unique URL key associated with a telecommunication action in response to the trigger. In this example, the unique URL is generated randomly which, as it is created by a computer system, is, in practice, pseudo-random. More than one unique random or pseudo-random URL key may be generated by the computer system 12 in response to a trigger telecommunication event each associated with a different telecommunication action. By way of example, for a call back service, in response to a telecommunication action that a user X missed a telephone call from another user Y, the telecommunication created by the computer system is for a call to be made between X and Y. Advantageously, in this example, there may be a choice of numbers or telephone devices or predetermined devices for X to make the call back from to Y each being a different telecommunication scenario or action. This may include originating the call from X to Y from a desk phone, a home phone, or a mobile phone. There may also be the option of X making the call to Y either now or at some predetermined time in the future, such as in 30 minutes or 1 hour. Each of these actions has a unique URL associated with it. Thus, each of these functions of may be controlled with a single press of a button or touch of a touch screen or mouse-click of an electronic device as each button accesses one of the unique URLs.

In response to the trigger, as shown at step 106 of FIG. 4, the computer system 12 causes a representation of the unique URL or URLs to be sent to a predetermined recipient, in this example, for example, by e-mail. The content of such an e-mail is illustrated in FIG. 3.

FIG. 3 shows an electronic device 22, in this example, a computer in the form of a tablet computer, such as an Apple iPad (registered trade mark) for a specific call scenario or action. The device 22 includes a display 60, in this example, a liquid crystal display (LCD) including, in this example, a touch-screen. In the example of FIG. 3, the e-mail sent to the recipient has been opened and the display displays the open e-mail. The open e-mail display includes information regarding the missed call. In this example, this includes the name 62 ("[first-name] [last-name]") and telephone number of the originator 64 ("01234 5678910") of the missed call as well as the date and time of the missed call 66 ("today at 16:32"). The display includes a plurality of representations of buttons 68a, b,c; 70a,b,c; 72a,b,c; and 74a,b,c each on a predetermined portion of the display. Each of the buttons has a unique URL associated with it such that when the button is selected by touching the display, a web browser of the device opens and the URL associated with the button is accessed by the web browser. The content of the web page that is opened by the browser describes the status of the call or action. In this example, buttons are provided to initiate the call or telecommunication action from a plurality of devices that are predetermined, such as the user's desk phone 68, home phone 70, or a choice of mobile phones 72,74. In this example, buttons are also provided such that the call from any of these devices may be initiated at different times, in this example immediately 68a, 70a, 72a, 74a or with a delay of 30 minutes 68b, 70b, 72b, 74b or 1 hour 68c, 70c, 72c, 74c from when the relevant button is pressed.

Turning back to FIG. 4, as indicated by step 108, the computer system 12 checks whether a URL has been accessed by touching the appropriate portion of the e-mail content of FIG. 3. If not, as highlighted at step 110 of FIG. 4, the unique URL remains active until an action is made to terminate it by the computer system 12 causes it to terminate (for example, if the URL has not been accessed for a particular predetermined time, such as one year). If the URL key is accessed, typically, in this example, by a user selecting a button linking to the URL, then the user's web browser interacts with the computer system (step 112 of FIG. 4) and in response to the web browser of the user's electronic device accessing a URL associated with one of the telecommunication actions, the telecommunication action or call scenario is activated (step 114 of FIG. 4). In this example, the computer system 12 issues a command to the phone system 18 to set-up the required call. The result of the command is output 19 from the phone system 18 of FIG. 1. As shown at step 116 of FIG. 4, if the telecommunication action is indicated as not successful, for example, Y does not answer the call within a predetermined time period as indicated by the phone system then the URL remains active. However, a new URL key may be generated (step 118 of FIG. 4) or the telecommunication action associated with the URL may be updated, for example, to include information as to the number of attempts at call back that have been made. The computer system 12 then continues to act at step 108, to check whether the URL has been accessed. As shown at step 120 of FIG. 4, if the telecommunication action is indicated as successful, for example, Y answers the call as indicated by an output result 19 from the phone system 18 then the telecommunication action or call scenario is completed and input is made to the computer system to generate a new URL (step 122 of FIG. 4). The new URL has content associated with it for display on the web browser of the electronic device. In this example, as a result, a web page of the web browser of the electronic device 22 displays an indication that the telecommunication action was successful. Such a web page 54 is illustrated in FIG. 2. The webpage displays thanks to the user for using the service 56 implying that the single touch call back request of this example was successful. Subsequently, the computer system 12 of the telecommunication system 10 is updated such that the telecommunication action associated with the URL is terminated. This may, for example, result in an error message being generated and transmitted to an electronic device via a web page if the URL is later accessed by the electronic device. It should be mentioned that, in an alternative example, a URL may still be associated with the same telecommunication action even if the telecommunication action is successfully carried out. So, for example, the same e-mail may be used repeatedly to create a call between users. Of course, the URL may be provided in an alternative medium to an e-mail, such as a missed call notification, an instant message, an SMS message or text, or an electronic calendar event (the action may be scheduled if the URL is provided as an electronic calendar event). The telecommunication action or scenario may be an alternative to a one-to-one call, such as a conference call.

The telecommunication system 10 may be configured to change the unique URL in response to a telecommunication action. For example, if an attempt is made by one user X to call another user Y by accessing a unique URL, but the result of the attempt as indicated by the phone system 18 is that the number used for X is not valid, then a new unique URL is generated that for example causes a screen to be displayed on the user's web browser of their electronic device 22 that the number is not valid. The change to the unique URL may simply be that additional characters are added to the previous unique URL key to generate the new unique URL key.

The telecommunication system 10 may change a telecommunication action associated with a unique URL in response to a telecommunication action. For example, if an attempt is made by one user X to call another user Y by accessing a unique URL, but the result of the attempt as indicated by the phone system 18 is that the telephone number used for X has changed to a new different telephone number, then the telecommunication action associated with the unique URL is changed by the computer system 12 to the new different telephone number.

As described above, the example computer system 12 also includes a store of rules 14, such as, user settings, corporate settings, administration settings, or device requirements. These may be stored on a hard disk drive or drives or other storage device of the computer system. These rules impact or change the communication action taken that is associated with a unique URL. For example, an administration setting may be that no action is to be taken in response to a URL being visited or accessed by a user (for example, because a user has left a company which employed them).

Embodiments of the present invention have been described. It will be appreciated that variations and modifications may be made to the described embodiments within the scope of the present invention.

The invention claimed is:

1. A telecommunication system comprising:
a computer system comprising:
a store of representations of telecommunication actions, wherein a unique uniform resource locator, URL, is associated with each of the telecommunication actions, the computer system being configured to, at least in part, command the telecommunication actions; and
a store of representations of telecommunication rules, wherein each telecommunication action is carried out, at least in part, under the command of the computer system in a manner dependent on at least one of the telecommunication rules;
the telecommunication system being configured such that, in response to an electronic device accessing a unique URL associated with one of the telecommunication actions, the telecommunication action is carried out, at least in part, under the command of the computer system in a manner dependent on at least one of the telecommunication rules; and wherein the telecommunication system is configured to change the unique URL to a new unique URL in response to a telecommunication action and associate a different telecommunication action with the new unique URL and/or change a telecommunication action associated with the unique URL;
the unique URL comprising a unique URL key, the unique URL key forming a real time call flow management key, the unique URL key being changeable via addition of characters to the key to form a new unique URL key, wherein such changing is provided in real time throughout a single call flow in order to provide corresponding result to the call flow.

2. A telecommunication system according to claim 1, wherein the telecommunication system is configured to change a telecommunication action associated with the unique URL in response to a telecommunication action.

3. A telecommunication system according to claim 1, wherein the unique URL is accessed by a web browser by selecting a predetermined portion on a display of the electronic device.

4. A telecommunication system according to claim 1, wherein the unique URL is accessed by a web browser of the electronic device by the electronic device being located at a predetermined location.

5. A telecommunication system according to claim 1, wherein the computer system is configured to generate at least one unique URL associated with a telecommunication action in response to a trigger.

6. A telecommunication system according to claim 5, wherein the computer system is configured to generate a plurality of unique URLs each associated with a telecommunication action in response to a trigger.

7. A telecommunication system according to claim 5, wherein the computer system is configured to generate each of the at least one unique URL randomly or pseudo-randomly.

8. A telecommunication system according to claim 5, wherein, in response to the trigger, a representation of each of the at least one unique URL is sent to a predetermined recipient.

9. A telecommunication system according to claim 8, wherein the representation of each of the at least one unique URL is sent to the predetermined recipient by one or more of: e-mail, missed call notification, instant message, SMS message or text, electronic calendar event.

10. A telecommunication system according to claim 5, wherein the trigger comprises at least one of: a telephone call, a scheduled telephone call, a missed telephone call, location of the electronic device, electronic device status, administration input, telephone call duration, telephone call has already happened, user input, social media input.

11. A telecommunication system according to claim 1, wherein the rules comprise at least one of: user settings, corporate settings, administration settings, authentication requirements, validation requirements, device requirements.

12. A telecommunication system according to claim 1, wherein the telecommunication action is carried out on the electronic device or at least one other predetermined electronic device.

13. A telecommunication system according to claim 1, wherein the unique URL is associated with content for use on the electronic device or at least one other predetermined electronic device.

14. A telecommunication system according to claim 13, wherein the content is for display on the electronic device or the at least one other predetermined electronic device.

15. A telecommunication system according to claim 13, wherein the telecommunication system is configured such that, in response to the electronic device accessing the unique URL associated with one of the telecommunication actions, a representation of the content is transmitted to the electronic device or the at least one other predetermined electronic device.

16. A telecommunication system according to claim 13, wherein the content is a representation of status of the telecommunication action.

17. A telecommunication method, the method comprising:
   an electronic device accessing a unique uniform resource locator, URL, wherein the unique URL is associated with a telecommunication action and a representation of the telecommunication action is stored in a store of a computer system; and
   in response to the electronic device accessing the unique URL, the telecommunication action associated with the unique URL is carried out, at least in part, under the command of the computer system in a manner dependent on at least one telecommunication rule stored in a store of the computer system;
   wherein the telecommunication method further comprises changing the unique URL to a new unique URL in response to a telecommunication action and associating a different telecommunication action with the new unique URL and/or changing a telecommunication action associated with the unique URL; and
   wherein the unique URL comprises a unique URL key, wherein the unique URL key forms a real time call flow management key, wherein the unique URL key is changeable via addition of characters to the key to form a new unique URL key, and wherein such changing is provided in real time throughout a single call flow in order to provide corresponding result to the call flow.

18. A computer system for commanding a telecommunication action, the computer system comprising:
   a store of representations of telecommunication actions, wherein a unique uniform resource locator, URL, is associated with each of the telecommunication actions, the computer system being configured to, at least in part, command the telecommunication actions; and
   a store of representations of telecommunication rules, wherein each telecommunication action is carried out, at least in part, under the command of the computer system in a manner dependent on at least one of the telecommunication rules;
   the computer system being configured such that, in response to an electronic device accessing a unique URL associated with one of the telecommunication actions, the telecommunication action is carried out, at least in part, under the command of the computer system in a manner dependent on at least one of the telecommunication rules; and wherein the telecommunication system is configured to change the unique URL to a new unique URL in response to a telecommunication action and associate a different telecommunication action with the new unique URL and/or change a telecommunication action associated with the unique URL;
   the unique URL comprising a unique URL key, the unique URL key forming a real time call flow management key, the unique URL key being changeable via addition of characters to the key to form a new unique URL key, wherein such changing is provided in real time throughout a single call flow in order to provide corresponding result to the call flow.

* * * * *